(12) United States Patent
Katayama

(10) Patent No.: US 12,249,814 B2
(45) Date of Patent: Mar. 11, 2025

(54) VALVE GAS FILTER AND GAS-INSULATED SWITCHGEAR

(71) Applicant: Mitsubishi Electric Corporation, Tokyo (JP)

(72) Inventor: Kazuya Katayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 220 days.

(21) Appl. No.: 18/042,348

(22) PCT Filed: Oct. 22, 2020

(86) PCT No.: PCT/JP2020/039670
§ 371 (c)(1),
(2) Date: Feb. 21, 2023

(87) PCT Pub. No.: WO2022/085145
PCT Pub. Date: Apr. 28, 2022

(65) Prior Publication Data
US 2023/0327411 A1    Oct. 12, 2023

(51) Int. Cl.
*H02B 13/055* (2006.01)
*H02B 13/045* (2006.01)
*H02B 13/065* (2006.01)

(52) U.S. Cl.
CPC ......... *H02B 13/055* (2013.01); *H02B 13/045* (2013.01); *H02B 13/065* (2013.01)

(58) Field of Classification Search
CPC . H02B 11/04; H02B 1/20; H02B 1/04; H01B 17/583
See application file for complete search history.

(56) References Cited

U.S. PATENT DOCUMENTS

| | | | | |
|---|---|---|---|---|
| 3,681,549 | A | * 8/1972 | Schmitz | H02B 13/045 218/83 |
| 3,849,618 | A | * 11/1974 | Wagner | H01H 33/57 218/43 |
| 7,931,741 | B2 | * 4/2011 | Osumi | H02G 5/065 96/108 |

(Continued)

FOREIGN PATENT DOCUMENTS

| JP | S56131085 A | 10/1981 |
|---|---|---|
| JP | S59201616 A | 11/1984 |

(Continued)

OTHER PUBLICATIONS

International Search Report (PCT/ISA/210) with translation and Written Opinion (PCT/ISA/237) mailed on Dec. 1, 2020, by the Japan Patent Office as the International Searching Authority for International Application No. PCT/JP2020/039670. (10 pages).

*Primary Examiner* — William H. Mayo, III
*Assistant Examiner* — Rhadames Alonzo Miller
(74) *Attorney, Agent, or Firm* — BUCHANAN, INGERSOLL & ROONEY PC

(57) ABSTRACT

A valve gas filter includes: a valve box attached to a gas enclosing port connected to a gas-insulated device to be filled with an insulating gas and hermetically sealed; and a valve body that opens and closes a gas passage by moving in the valve box, in which the valve body includes a gas filter, which is formed by a porous insulating material and allows passage of an insulating gas but does not allow passage of foreign matter contained in the insulating gas.

7 Claims, 3 Drawing Sheets

(56) References Cited

U.S. PATENT DOCUMENTS

| | | |
|---|---|---|
| 7,938,895 B2 | 5/2011 | Osumi et al. |
| 2008/0073188 A1* | 3/2008 | Emura ............... H01H 9/22 200/50.12 |
| 2010/0172069 A1* | 7/2010 | Betz ................ H02B 5/06 361/612 |
| 2010/0236905 A1* | 9/2010 | Capelli ............ H02B 11/127 200/50.24 |
| 2012/0006665 A1* | 1/2012 | Sologuren-Sanchez ............... H02G 5/002 200/5 A |
| 2012/0138575 A1* | 6/2012 | Saxl ................ H01H 33/56 218/156 |
| 2012/0181156 A1* | 7/2012 | Betz ................ H01H 31/003 200/48 R |
| 2013/0148268 A1* | 6/2013 | Sologuren-Sanchez ............... H02B 5/06 361/612 |
| 2013/0167675 A1* | 7/2013 | Kim ................ H01H 31/003 74/89.17 |
| 2013/0279084 A1* | 10/2013 | Harada .............. H02B 5/06 361/618 |
| 2013/0292358 A1* | 11/2013 | Hu .................. H01H 33/42 218/5 |
| 2015/0236485 A1* | 8/2015 | Hashimoto ........... H02B 5/06 361/618 |
| 2016/0086744 A1* | 3/2016 | Tasaka .............. H01H 9/02 200/293 |
| 2016/0126028 A1* | 5/2016 | Mun ................ H02B 11/133 200/50.12 |
| 2020/0126742 A1* | 4/2020 | Ranjan ............ H01H 33/7038 |
| 2020/0280178 A1* | 9/2020 | Barenthin ........... H02B 5/06 |
| 2021/0057177 A1* | 2/2021 | Tanigaki ........... H02B 13/035 |
| 2021/0175691 A1* | 6/2021 | Yoshida ........... H02B 13/0352 |
| 2021/0288477 A1* | 9/2021 | Fujioka ........... H02B 13/035 |

FOREIGN PATENT DOCUMENTS

| | | | |
|---|---|---|---|
| JP | 2009165234 A | 7/2009 | |
| JP | 2009254140 A | * 10/2009 | ............ H02G 5/06 |

\* cited by examiner

VALVE GAS FILTER AND GAS-INSULATED SWITCHGEAR

FIELD

The present disclosure relates to a valve gas filter and a gas-insulated switchgear to open and close an insulating gas passage.

BACKGROUND

A gas-insulated device using sulfur hexafluoride ($SF_6$) having high insulation properties has high insulation performance, but the insulation performance may be deteriorated to lead to a ground fault if metal foreign matter enters. Therefore, it is desirable to prevent entry of metal foreign matter into the gas-insulated device.

In a gas-insulated switchgear described in Patent Literature 1, a gas filter is attached to a gas enclosing port in order to prevent entry of foreign matter such as metal foreign matter into the gas-insulated device. This gas filter has a pore diameter size of several tens to several hundreds μm, and prevents entry of foreign matter having a diameter larger than the pore diameter size into the gas-insulated device.

CITATION LIST

Patent Literature

Patent Literature 1: Japanese Patent Application Laid-open No. 2009-165234

SUMMARY

Technical Problem

However, in the technique of Patent Literature 1, when an insulating gas is recovered from the gas-insulated device, a pressure loss increases and thus it takes a long time to recover the gas. Therefore, the gas filter is removed at the time of gas recovery work and it has been necessary to attach the gas filter again when enclosing the insulating gas. Therefore, it takes time and effort for replacement work of the gas.

The present disclosure has been made in view of the above, and an object thereof is to obtain a valve gas filter capable of easily switching between gas recovery and gas enclosing while preventing entry of foreign matter into a gas-insulated device.

Solution to Problem

In order to solve the above-described problem and achieve the object, a valve gas filter of the present disclosure includes: a valve box attached to a gas enclosing port connected to a gas-insulated device, wherein the gas-insulated device is to be filled with an insulating gas and hermetically sealed; and a valve body to open and close a gas passage by moving in the valve box. The valve body includes a filter that is formed by a porous insulating material and that allows passage of the insulating gas but does not allow passage of foreign matter contained in the insulating gas.

Advantageous Effects of Invention

The valve gas filter according to the present disclosure exhibits an effect of easily switching between gas recovery and gas enclosing while preventing entry of foreign matter into the gas-insulated device.

DESCRIPTION OF EMBODIMENTS

Hereinafter, a valve gas filter and a gas-insulated switchgear according to embodiments of the present disclosure will be described in detail with reference to the drawings.

First Embodiment

Figure 1:
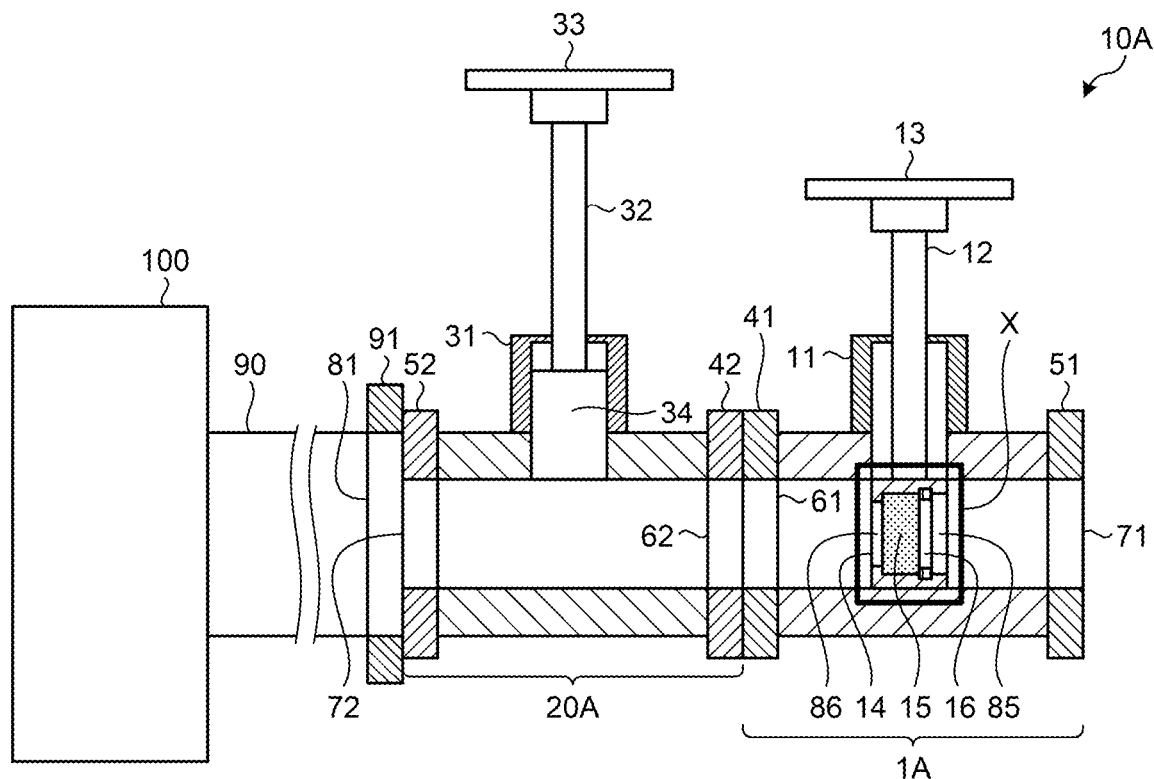
FIG. 1 is a diagram illustrating a configuration of a gas-insulated switchgear including a valve gas filter according to a first embodiment.
Figure 2:
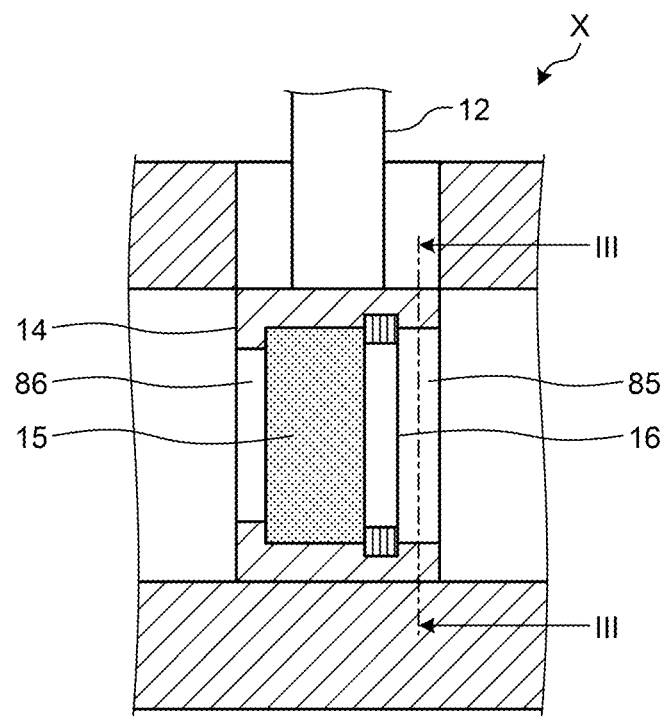
FIG. 2 is an enlarged view of a region X illustrated in FIG. 1.
Figure 3:
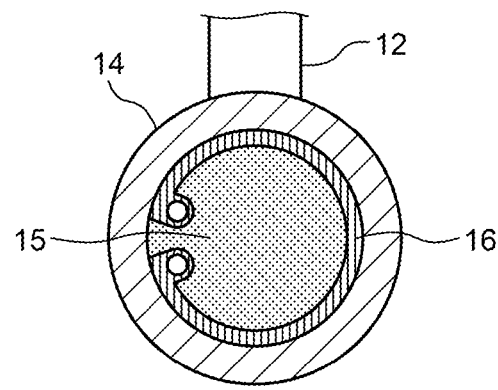
FIG. 3 is a view in the direction of arrows III-III in FIG. 2.
Figure 4:
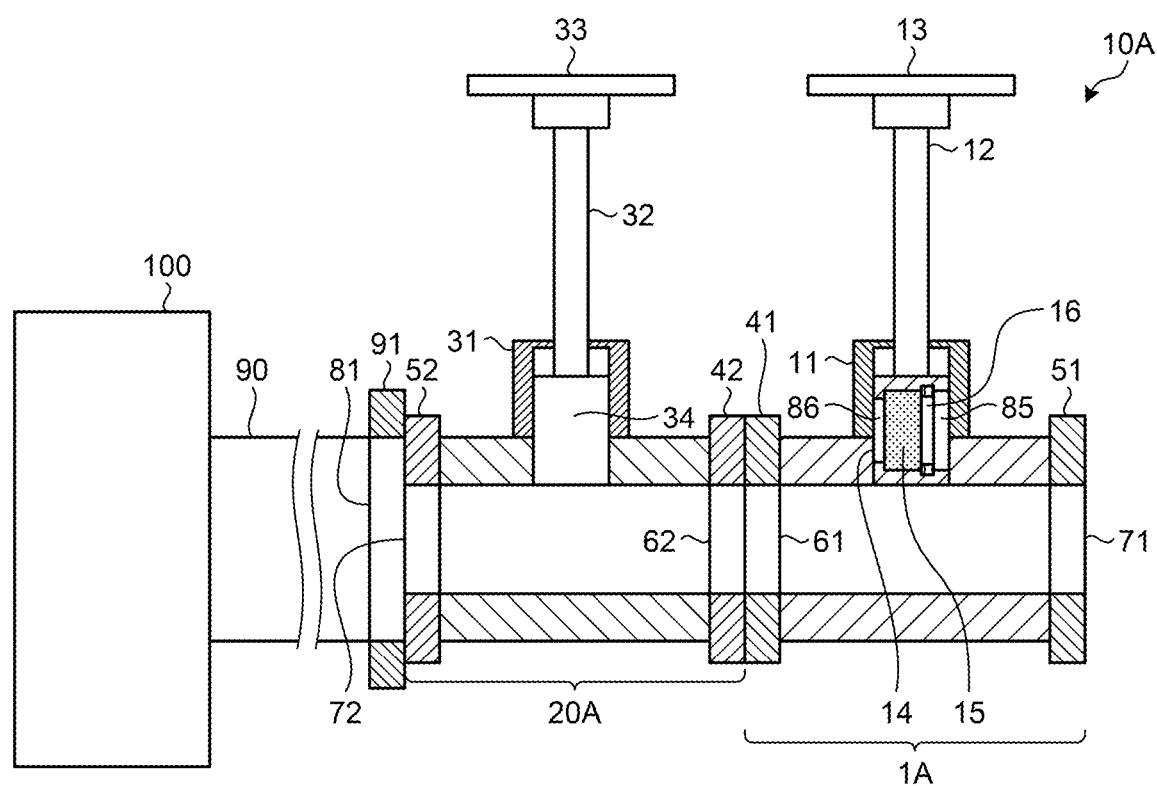
FIG. 4 is a diagram illustrating a state at a time of gas recovery of the gas-insulated switchgear including the valve gas filter according to the first embodiment.

FIG. 1 is a diagram illustrating a configuration of a gas-insulated switchgear including a valve gas filter according to a first embodiment. FIG. 1 illustrates a state at a time of gas filling of a gas-insulated switchgear 10A including a valve gas filter 1A which is a valve with a gas filter. FIG. 2 is an enlarged view of a region X illustrated in FIG. 1, and FIG. 3 is a view in the direction of arrows III-III in FIG. 2. FIG. 4 is a diagram illustrating a state at a time of gas recovery of the gas-insulated switchgear including the valve gas filter according to the first embodiment. FIGS. 1 and 4 are cross-sectional views of the gas-insulated switchgear 10A.

The gas-insulated switchgear 10A includes a gas-insulated device 100, the valve gas filter 1A, a main body valve 20A, and a connecting pipe 90. In the gas-insulated switchgear 10A, the valve gas filter 1A is attached to a gas enclosing port of the main body valve 20A. The gas-insulated device 100 is a device to be filled with an insulating gas and hermetically sealed.

The main body valve 20A is a valve connected to the gas-insulated device 100. To a tank (not illustrated) or the like included in the gas-insulated device 100, an insulating gas such as $SF_6$ is sent via the valve gas filter 1A and the main body valve 20A. In addition, from the tank or the like included in the gas-insulated device 100, the insulating gas such as $SF_6$ is recovered via the valve gas filter 1A and the main body valve 20A. Further, when drawing a vacuum in the tank included in the gas-insulated device 100, gas or the like in the tank is suctioned through the valve gas filter 1A and the main body valve 20A.

Note that, since states of the valve gas filter 1A and the main body valve 20A are identical at a time of gas recovery work and at a time of drawing a vacuum, description at the time of drawing a vacuum will be omitted in the following description.

The valve gas filter 1A includes a valve box 11, a valve rod 12, a handle 13, and a valve body 14. The valve body 14 includes a gas filter 15 and a snap ring 16. The valve box 11 has, for example, a tubular shape, and the inside of the valve box 11 serves as a passage (hereinafter, referred to as a gas passage) of the insulating gas. The valve box 11 includes connecting parts 41 and 51. The connecting part 41 is connected to a connecting part 42 included in the main body valve 20A, and a gas hose (not illustrated) to be described later is connected to the connecting part 51. The connecting part 42 is disposed at a position facing the connecting part 41. The valve rod 12 is joined to the handle 13 and the valve body 14. Part of the valve rod 12 can be inserted into the gas passage in the valve box 11.

The handle 13 can reciprocate in a direction perpendicular to a passage direction of the gas passage. When the handle 13 moves toward the gas passage, the valve rod 12 and the valve body 14 move toward the gas passage. Further, when the handle 13 moves in a direction away from the gas passage, the valve rod 12 and the valve body 14 move in the direction away from the gas passage. The valve body 14 closes the gas passage when the handle 13 moves toward the gas passage, and opens the gas passage when the handle 13 moves away from the gas passage.

The valve body 14 of the first embodiment is configured to allow passage of an insulating gas. The valve body 14 is configured using, for example, a tubular member. The valve body 14 has an upper surface and a bottom surface having a shape similar to a cut surface when the gas passage is cut along a plane perpendicular to the passage direction. When the cut surface is circular, the upper surface and the bottom surface of the valve body 14 are also circular. In FIG. 1, the right side of the valve body 14 is the upper surface of the valve body 14, and the left side of the valve body 14 is the bottom surface of the valve body 14. The snap ring 16 has a ring shape smaller than an outer peripheral region of the upper surface or the bottom surface of the valve body 14.

The valve body 14 can move along an axial direction of the valve rod 12 in the valve box 11. The valve body 14 opens and closes the gas passage by moving in the axial direction of the valve rod 12 in the valve box 11, that is, in a direction perpendicular to the gas passage. The gas filter 15 is incorporated in the valve body 14. Further, the valve body 14 has openings 85 and 86 to allow passage of the insulating gas via the gas filter 15. The opening 85 is provided on the upper surface side of the valve body 14, and the opening 86 is provided on the bottom surface side of the valve body 14. The gas filter is fixed to an inner surface of the tubular member included in the valve body 14 by the snap ring 16. This allows the gas filter 15 to be integrated with the valve body 14. In the valve gas filter 1A, the valve body 14 in which the gas filter 15 is incorporated can be moved without removing the valve body 14. That is, since it is not necessary to remove the gas filter 15 at a time of gas recovery work, it is not necessary to attach the gas filter again when enclosing the insulating gas. Therefore, replacement work of the gas is facilitated.

The gas filter 15 is formed using a porous insulating material. The gas filter 15 has a pore diameter size of several tens to several hundreds μm, and can prevent entry of foreign matter having a diameter larger than the pore diameter size. An example of the pore diameter size of the gas filter 15 is 200 μm. The gas filter 15 allows passage of the insulating gas and prevents passage of foreign matter that causes dielectric breakdown. As described above, the gas filter 15 is a filter that is stable against foreign matter of a specific size contained in the insulating gas. An example of the foreign matter filtered by the gas filter 15 is metal foreign matter.

The main body valve 20A includes a valve box, a valve rod, a handle, and the like similar to those of the valve gas filter 1A. That is, the main body valve 20A includes a valve box 31, a valve rod 32, a handle 33, and a valve body 34. The valve box 31 has a structure similar to the valve box 11, and the valve rod 32 has a structure similar to the valve rod 12. The valve box 31 of the main body valve 20A includes connecting parts 42 and 52. The main body valve 20A is different from the valve gas filter 1A in that the main body valve 20A does not include the gas filter 15 and the snap ring 16 unlike the valve gas filter TA. That is, the valve body 14 of the valve gas filter 1A includes the gas filter 15 and the snap ring 16, but the main body valve 20A does not include the gas filter 15 and the snap ring 16.

In the valve gas filter 1A, an opening 61 is provided in the connecting part 41 for connection with the main body valve 20A. In the main body valve 20A, an opening 62 is provided in the connecting part 42 for connection with the valve gas filter 1A. This allows the insulating gas to move between the valve gas filter 1A and the main body valve 20A regardless of the states of the valve gas filter 1A and the main body valve 20A.

Further, in the valve gas filter 1A, an opening 71 is provided in the connecting part 51 opposite to the connecting part 41 for connection with the main body valve 20A. To the opening 71, a gas hose or the like to allow passage of the insulating gas is connected. This allows the insulating gas to move between the valve gas filter 1A and the gas hose regardless of the state of the valve gas filter 1A. Note that, to the gas hose or the like connected to the opening 71 of the connecting part 51, a gas suction and discharge device such as a vacuum pump is attached.

Further, in the main body valve 20A, an opening 72 is provided in the connecting part 52 disposed at a position opposite the connecting part 42. The connecting part 52 is connected to a connecting part 91 included in a connecting pipe 90. The connecting part 91 is provided with an opening 81. Further, to the connecting pipe 90, the tank or the like included in the gas-insulated device 100 is connected. This allows the insulating gas to move between the main body valve 20A and the tank regardless of the state of the main body valve 20A. Examples of the connecting parts 41, 42, 51, 52, and 91 are flanges. The connecting part 51 is a first connecting part, and the connecting part 41 is a second connecting part.

At a time of enclosing the insulating gas in the gas-insulated device 100, the gas-insulated switchgear 10A moves the valve body 34 of the main body valve 20A in the direction away from the gas passage, and moves the valve body 14 of the valve gas filter 1A in the direction toward the gas passage. That is, at a time of enclosing the insulating gas in the gas-insulated device 100, the gas-insulated switchgear 10A opens the valve body 34 of the main body valve 20A and closes the valve body 14 of the valve gas filter 1A. As a result, when enclosing the insulating gas in the gas-insulated device 100, the gas passage of the main body valve 20A is opened and the gas passage of the valve gas filter 1A is blocked by the gas filter 15 of the valve body 14. In this case, when the insulating gas is sent to the valve gas filter 1A via the gas hose, the valve gas filter 1A sends the insulating gas to the main body valve 20A via the gas filter 15. The gas filter 15 allows passage of the insulating gas but does not allow passage of foreign matter contained in the insulating gas. That is, the gas filter 15 sends the insulating gas to the main body valve 20A while preventing entry of foreign matter into the main body valve 20A. The insulating gas sent to the main body valve 20A is sent to the tank or the like included in the gas-insulated device 100.

Further, at a time of recovering the insulating gas from the gas-insulated device 100, the gas-insulated switchgear 10A moves the valve body 34 of the main body valve 20A and the valve body 14 of the valve gas filter 1A in the direction away from the gas passage. That is, at a time of recovering the insulating gas from the gas-insulated device 100, the gas-insulated switchgear 10A opens the valve body 34 of the main body valve 20A and opens the valve body 14 of the valve gas filter 1A. As a result, when the insulating gas is recovered from the gas-insulated device 100, the gas passage of the main body valve 20A is opened and the gas passage of the valve gas filter 1A is opened. In this case, when the insulating gas is sent to the valve gas filter 1A via the main body valve 20A, the valve gas filter 1A sends the insulating gas to the gas hose without passing through the gas filter 15.

When switching between gas recovery and gas enclosing, the valve gas filter 1A operates the handle 13 to cause the valve body 14 to open and close the gas passage, so that switching between gas recovery and gas enclosing can be easily performed. That is, in the valve gas filter 1A, the gas filter 15 is incorporated in the valve body 14, and the presence or absence of interposition of the gas filter 15 is switched by valve opening/closing at the time of gas recovery and at the time of gas enclosing.

As a result, when gas recovery and gas enclosing are switched, attachment or detachment of the valve gas filter 1A and the main body valve 20A is not performed. That is, in the valve gas filter 1A, the work of attaching and detaching the gas filter 15 can be omitted at the time of switching between use and non-use of the gas filter 15. In the valve gas filter LA, even if the attaching and detaching of the gas filter 15 are omitted, passage of the insulating gas via the gas filter 15 is allowed at the time of gas enclosing of $SF_6$, and passage of the insulating gas not via the gas filter 15 is allowed at the time of gas recovery.

If the gas filter 15 itself is bolted to the main body valve 20A, it takes a long time to perform the attaching and detaching work on the gas filter 15 when the gas recovery and the gas enclosing are switched. Further, in this case, when the gas filter 15 is removed from the main body valve 20A, the hose is exposed to the atmosphere. Therefore, after the gas filter 15 is attached to the main body valve 20A, it is necessary to draw a vacuum in the hose again, and thus unnecessary work occurs. In addition, there is a case where foreign matter enters the main body valve 20A during the hose attaching work and the hose removing work. As described above, if the gas filter 15 itself is bolted to the main body valve 20A, various problems occur.

Note that, the insulating gas filled into the gas-insulated device 100 is not limited to $SF_6$, and may be an alternative gas for $SF_6$. Examples of alternative gases for $SF_6$ are $C_4$—FN mixed gas, $C_5$—FN mixed gas, $SF_6/N_2$ mixed gas, $SF_6/CF_4$ mixed gas, and HFO1234zeE. Further, examples of alternative gases for $SF_6$ may include natural gas such as $CO_2$ and dry air. Note that $C_4$ is a hydrocarbon having four carbon atoms (butane, butylene, and the like), and FN is fluorine nitride. Note that $C_5$ is a hydrocarbon having five carbon atoms (pentane and the like). Note that $N_2$ is nitrogen, and $CF_4$ is carbon tetrafluoride. Note that HFO1234zeE is 1,3,3,3-tetrafluoropropene. Note that $CO_2$ is carbon dioxide. In addition, a voltage class of the gas-insulated switchgear 10A to which the valve gas filter 1A is applied ranges from a medium-voltage class to a high-voltage class, and an application range is wide.

Further, the gas-insulated device 100 may include the valve gas filter 1A instead of the main body valve 20A, and the main body valve 20A may be connected to the valve gas filter 1A. That is, the position of the valve gas filter 1A and the position of the main body valve 20A illustrated in FIGS. 1 and 4 may be interchanged.

As described above, according to the first embodiment, the valve body 14 includes the gas filter 15 that allows passage of the insulating gas but does not allow passage of foreign matter such as metal foreign matter contained in the insulating gas. Therefore, it is possible to easily switch between gas recovery and gas enclosing while preventing entry of foreign matter into the gas-insulated device 100. That is, replacement work of the insulating gas can be easily performed with less time and effort. In addition, since it is not necessary to attach and detach the gas filter 15, unnecessary work can be omitted, and entry of foreign matter at the time of attachment and detachment can be prevented. Note that similar effects can be obtained not only in the case of gas recovery but also in the case of drawing a vacuum before gas enclosing.

Second Embodiment

Next, a second embodiment will be described with reference to FIG. 5. In the second embodiment, a valve gas filter and a main body valve are integrally formed.

Figure 5:
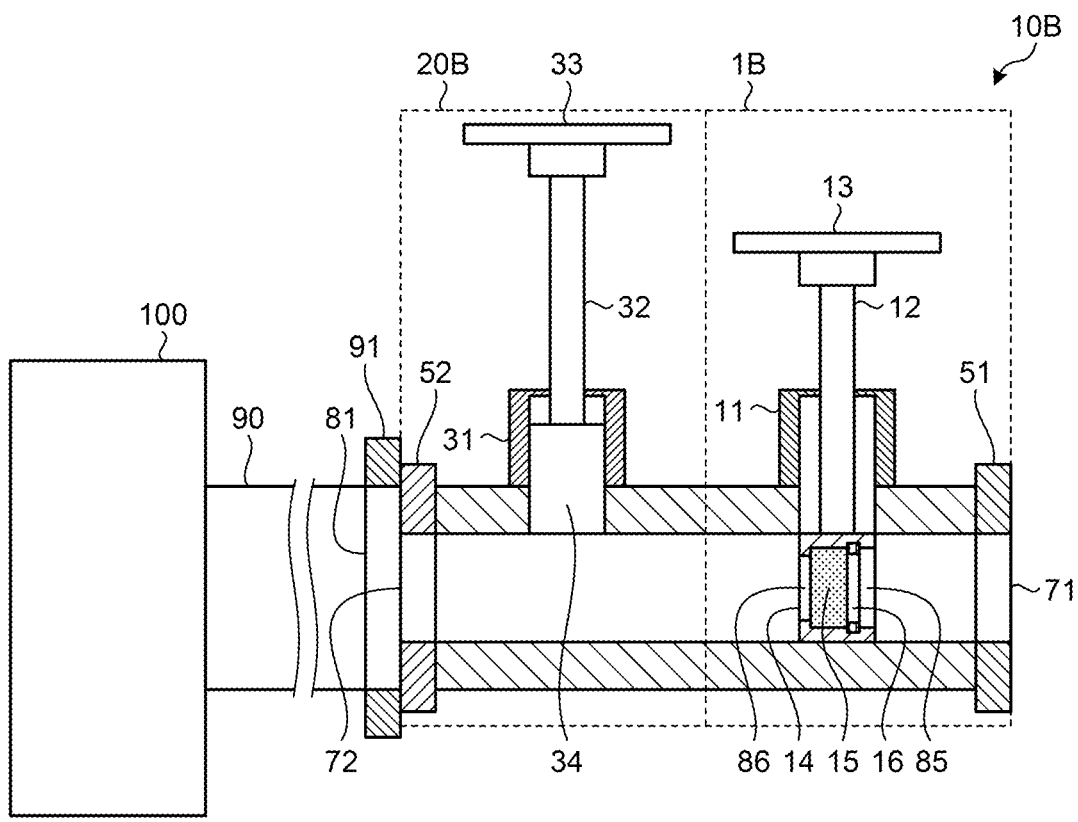
FIG. 5 is a diagram illustrating a configuration of a gas-insulated switchgear including a valve gas filter according to a second embodiment.

FIG. 5 is a diagram illustrating a configuration of a gas-insulated switchgear including a valve gas filter according to the second embodiment. FIG. 5 illustrates a cross-sectional view of a state of a gas-insulated switchgear 10B at a time of gas filling of the gas-insulated switchgear 10B including a valve gas filter 1B that is a valve with a gas filter. Among the individual components in FIG. 5, components that achieve functions identical to those of the gas-insulated switchgear 10A of the first embodiment illustrated in FIG. 1 are denoted by identical reference numerals, and redundant descriptions will be omitted. Further, a state of the gas-insulated switchgear 10B at a time of gas recovery is similar to a state of the gas-insulated switchgear 10A at a time of gas recovery in FIG. 4, and thus the description thereof will be omitted.

The gas-insulated switchgear 10B includes the gas-insulated device 100, the valve gas filter 1B, a main body valve 20B, and the connecting pipe 90. In the gas-insulated switchgear 10B, the valve gas filter 1B is joined to the main body valve 20B. The valve gas filter 1B and the main body valve 20B are integrally formed, and thus bolted connection or the like is unnecessary. This allows the insulating gas to move between the valve gas filter 1B and the main body valve 20B regardless of the states of the valve gas filter 1B and the main body valve 20B.

In this way, the valve gas filter 1B does not include the connecting part 41 unlike the valve gas filter 1A, and the main body valve 20B does not include the connecting part 42 unlike the main body valve 20A.

Similarly to the main body valve 20A, the main body valve 20B includes the valve box 31, the valve rod 32, the handle 33, and the valve body 34.

Note that the position of the valve gas filter 1B and the position of the main body valve 20B illustrated in FIG. 5 may be interchanged.

As described above, according to the second embodiment, in the gas-insulated switchgear 10B, since the valve gas filter 1B and the main body valve 20B are integrally formed, a user does not need to perform work of attaching the valve gas filter 1B to the main body valve 20B.

Further, similarly to the gas-insulated switchgear 10A, the gas-insulated switchgear 10B can easily switch between gas recovery and gas enclosing while preventing entry of foreign matter into the gas-insulated device 100. That is, replacement work of the insulating gas can be easily performed with less time and effort. In addition, since it is not necessary to attach and detach the gas filter 15, unnecessary work can be omitted, and entry of foreign matter at the time of attachment and detachment can be prevented.

The configurations illustrated in the above embodiments illustrate examples and can be combined with another known technique, and it is also possible to combine embodiments with each other and omit and change part of the configurations without departing from the gist.

REFERENCE SIGNS LIST 1A, 1B valve gas filter; 10A, 10B gas-insulated switchgear; 11, 31 valve box; 12, 32 valve rod; 13, 33 handle; 14, 34 valve body; 15 gas filter; 16 snap ring; 20A, 20B main body valve; 41, 42, 51, 52, 91 connecting part; 61, 62, 71, 72, 81, 85, 86 opening; 90 connecting pipe; 100 gas-insulated device.

The invention claimed is:

1. A valve gas filter comprising:
a valve box attached to a gas enclosing port connected to a gas-insulated device, wherein the gas-insulated device is to be filled with an insulating gas and hermetically sealed; and
a valve body configured using a tubular member whose upper surface and bottom surface are opened, the tubular member being arranged such that an axial direction is parallel to a gas passage of the insulating gas, the valve body opening and closing the gas passage by the tubular member moving in a direction perpendicular to the gas passage in the valve box, wherein
the valve body includes, in the tubular member, a filter that is formed by a porous insulating material and that allows passage of the insulating gas but does not allow passage of foreign matter contained in the insulating gas.

2. The valve gas filter according to claim 1, wherein the filter is fixed to an inner surface of the tubular member by a snap ring.

3. The valve gas filter according to claim 1, wherein the valve box further includes a first connecting part connectable to a gas hose through which the insulating gas passes, and a second connecting part connectable to a main body valve connected to the gas-insulated device.

4. The valve gas filter according to claim 1, wherein the valve box is integrally formed with a main body valve connected to the gas-insulated device.

5. A gas-insulated switchgear comprising:
a gas-insulated device to be filled with an insulating gas and hermetically sealed;
a valve box attached to a gas enclosing port connected to the gas-insulated device; and
a valve body configured using a tubular member whose upper surface and bottom surface are opened, the tubular member being arranged such that an axial direction is parallel to a gas passage of the insulating gas, the valve body opening and closing the gas passage by the tubular member moving in a direction perpendicular to the gas passage in the valve box, wherein
the valve body includes, in the tubular member, a filter that is formed by a porous insulating material and that allows passage of the insulating gas but does not allow passage of foreign matter contained in the insulating gas.

6. The valve gas filter according to claim 2, wherein the valve box further includes a first connecting part connectable to a gas hose through which the insulating gas passes, and a second connecting part connectable to a main body valve connected to the gas-insulated device.

7. The valve gas filter according to claim 2, wherein the valve box is integrally formed with a main body valve connected to the gas-insulated device.

* * * * *